Figure 1:
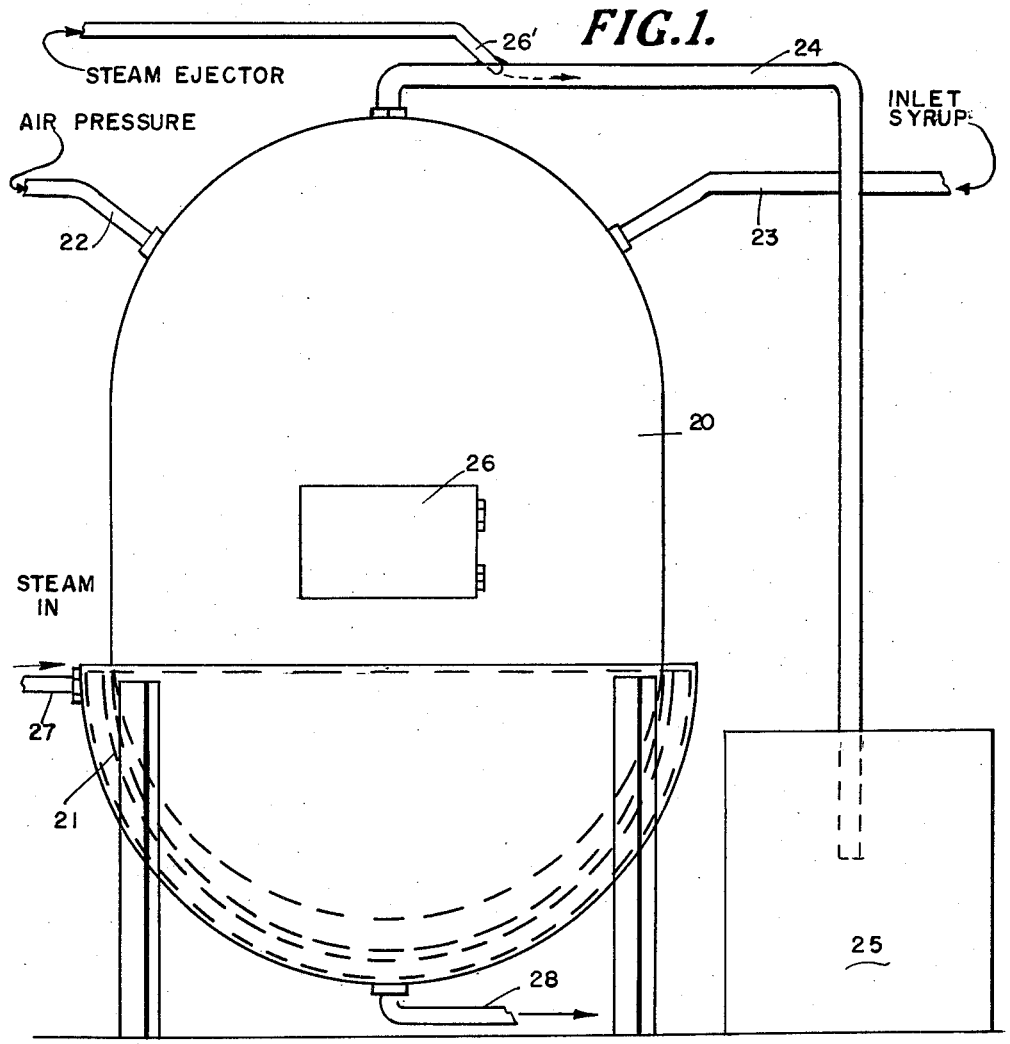

Dec. 25, 1962 O. C. HARTMANN 3,070,444
PROCESS FOR PREPARING PICKLES
Filed Sept. 11, 1959 2 Sheets-Sheet 1

INVENTOR
OTTO HARTMANN
BY Cushman, Darby & Cushman
ATTORNEYS

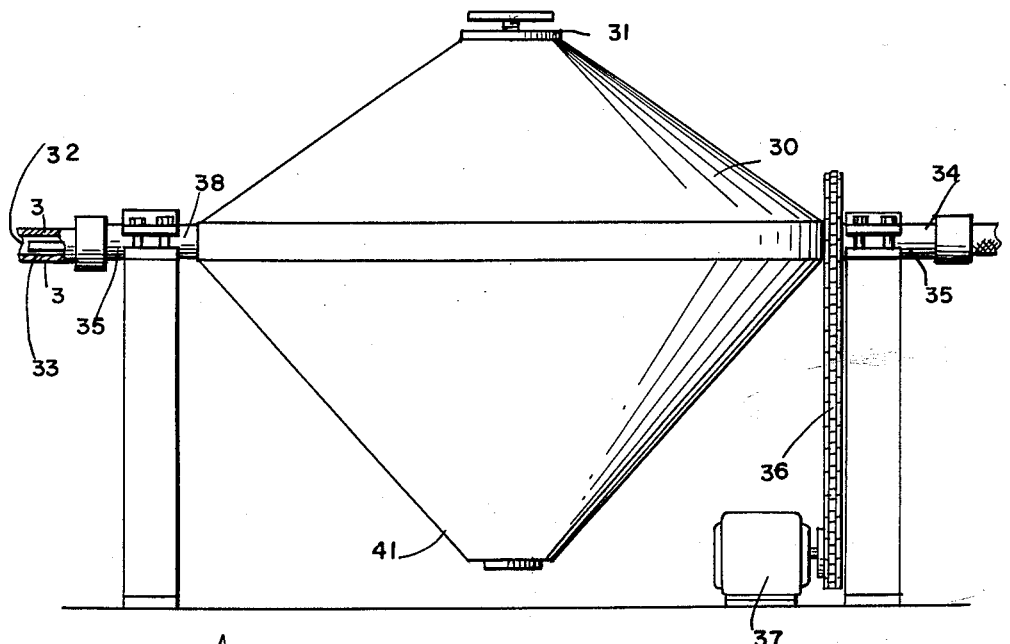
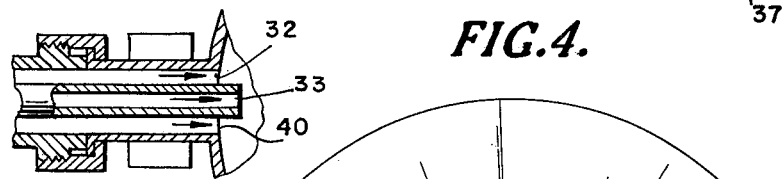
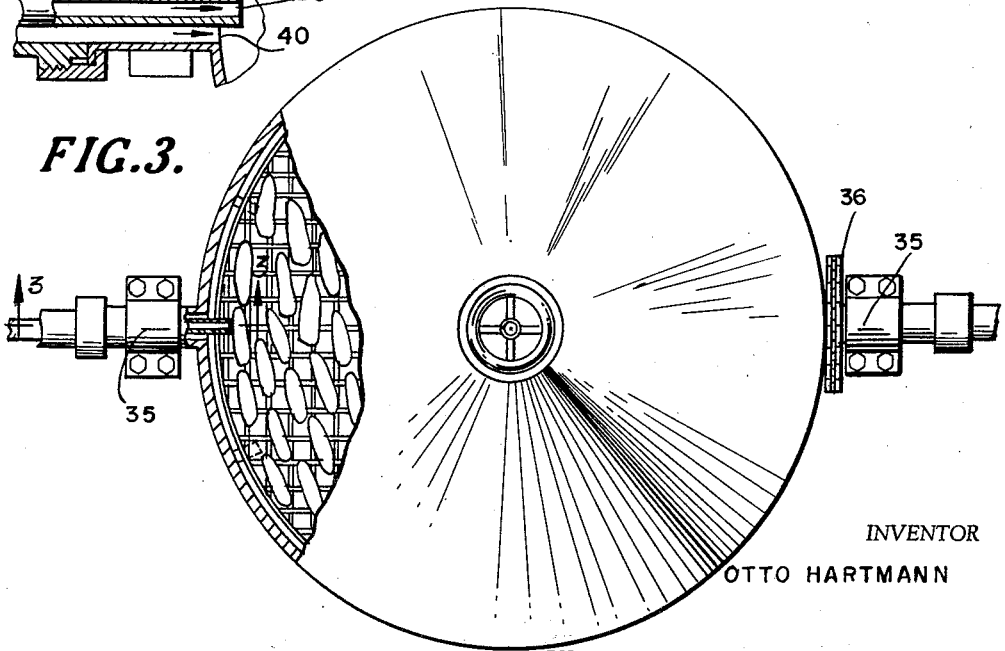

3,070,444
PROCESS FOR PREPARING PICKLES
Otto C. Hartmann, Chicago, Ill., assignor to Beatrice Foods Co., Chicago, Ill., a corporation of Delaware
Filed Sept. 11, 1959, Ser. No. 839,380
6 Claims. (Cl. 99—102)

This invention relates to the treatment of pickles and embodies an improved process for treating the same with conventional dill syrup or sugar syrup.

In the manufacture of the pickles the cucumbers are held in a salt water or aqueous brine solution of about 10 to 20% NaCl, usualy about 15%, for various periods of time at about 35° to 100° F., usually about 70° F., but in the winter sometimes at 35° F. so as to equalize the permeation throughout the pickle body, i.e., to "equalize" the pickles. Thereafter the pickles are drained and in their equalized condition, the solution is replaced with rinse water to give a temperature of about 90 to 100° F., e.g., 95° F. and held overnight for about 8 to 12 hours, usually about 9 hours whereby the brine solution in the equalized pickles is diluted and about 25% of the NaCl is removed from the pickles. By desalting as by rinsing with water just described at a temperature of about 90 to 100° F., in which range the solubility of the salt is best, and at the specific temperature range just indicated, there may be removed about 25 to 50% of the salt but about 25% is adequate in most cases. More than one rinse is sometimes used but is not preferred.

Thereafter, the pickles are drained and there remains in the pickles enough NaCl to render the pickles electrically conductive. In this condition, the pickles, in accordance with this invention, are passed on a conveyor which is preferably agitated through an electrical field wherein an electrical discharge in the form of arcing is passed through the pickles and opens up small openings through out the surface of the same. A conventional electrostatic apparatus is used for this purpose and the voltage of the electrostatic machine is between 15,000 and 25,000 volts, preferably 20,000 volts. This improved step alone will take the place of the customary pricking or piercing apparatus whereby the pickles are pierced with pins. In some cases, the electrical treatment will be after, i.e., supplement such pricking treatment, or the mechanical pricking may supplement the electrical treatment, i.e., be after the electrical treatment, all depending upon the character of the cucumbers and their condition at the time of treatment. Usually, the electrical treatment is adequate. In connection with the electrical treatment, of course, there must be sufficient salt present in the pickles to cause the electrical current to pass through the same, and where the salt content is removed within the range above recited, namely 25 to 50%, this is possible. Excellent results have been obtained in opening up the pores of the cucumbers where the rinsing removed about 50% of the salt but 25% is usually enough.

In connection with the electrical treatment with agitation of the cucumbers and the rinsing, these two steps might be combined with the rinsing taking place upon a conveyor leading to the electrostatic machine or upon a conveyor leading from the latter, such conveyors, including the conveyor of the electrostatic machine being suitably inclined and vibrated if desired. The conveyor in the electrostatic field is preferably vibrated as above described.

The pickles are now delivered to a tank having means for creating a positive pressure, i.e., above atmospheric pressure, and means for producing a reduced pressure, i.e., below atmospheric pressure, such means being capable of continuous intermittent operation to result in what is most readily described as a "breathing action" in the tank. The pickles are covered with hot or cold water which is brought to a temperature of about 90 to 100° F., e.g., 90° F. This breathing procedure brings about solution of about 50% of the remaining NaCl in the pickles covered by the water at a temperature of 90 to 100° F. This removal of the salt in the tank or vacuum-pressure pan having about a 200 gallon capacity will usually take about 10 to 20 minutes, e.g., about 15 minutes will get about 50% of the salt out, so that about 62½% of the original salt content of the pickles has now been removed. This amount, more or less, can be removed where brine pickles are desired and where dill or where sugar syrup is to be be incorporated in the drained pickles, a vacuum is drawn on the same in the pressure-vacuum tank which opens up the pores in the drained pickles and removes residual gases and moisture, and while a condition of reduced pressure is present and remains and is maintained, the sugar syrup or drill is introduced and by reason of the reduced pressure, will readily penetrate the open pores of the pickles. The sugar syrup or the dill syrup, where the latter is used, covers the pickles in the tank.

The invention, as will be appreciated, is primarily useful for making syrup pickles and after the syrup has been so introduced to the tank having a reduced pressure therein, the positive pressure and reduced pressure creating means are intermittently but continuously operated to produce a breathing effect until the pickles become equalized with the syrup. This usually takes 20 to 45 minutes, e.g., 30 minutes, and enables an effective result to be obtained uniformly in a minimum of time and with substantial economy.

While I have added the syrup and covered the pickles with the tank at normal atmospheric pressure or even increased pressure, and then subjected the pickles to the breathing action, I have found the foregoing procedure to be preferable to speed up the incorporation of the syrup or dill and uniformly equalize the pickles with the same, i.e., adding the liquid to be included in the pickles while the latter are in a tank under reduced pressure followed by subjecting the liquid covered pickles to the aforesaid breathing action.

Figures 5, 6:
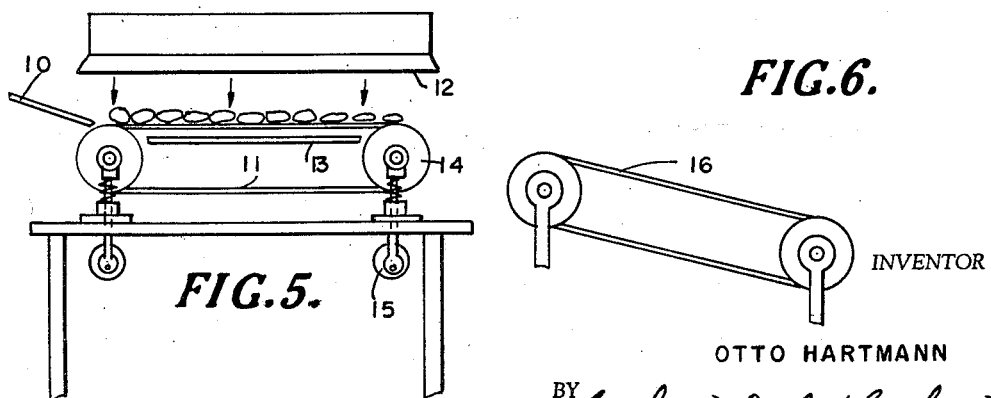

In the accompanying drawings,
FIGURE 1 is an elevational view of one form of construction for introducing a dill or syrup into the pickles,
FIGURE 2 is a view of a modification for accomplishing the same purpose,
FIGURE 3 is a detail on the line 3—3 of FIGURE 2,
FIGURE 4 is an elevational view partly broken away of the construction shown in FIGURES 2 and 3,
FIGURE 5 is a side elevation of the electrostatic machine and associated conveyor, the same being diagrammatically illustrated and also showing the inclined feeding conveyor; this feeding conveyor may be used as a rinsing apparatus, and
FIGURE 6 is an elevation of the receiving conveyor from the electrostatic machine which, as illustrated, is inclined and may also be employed, if desired, for rinsing, it being understood that rinsing of the brine treated cucumbers is preferably accomplished by the use of rinsing water having a temperature of 90 to 100° F. although room temperature may be used, if desired.

Referring to FIGURE 5, the cucumbers in the salting vat where they have been preserved for anywhere from a month to two years or more in salt water are de-salted in the vat by draining and then replacing the drained brine with rinsing water at 90 to 100° F., in this example about 95° F., to remove about 25 to 50% of the salt in this instance 25%, whereupon such cucumbers are again drained and then are fed on the inclined conveyor 10 to the conveyor 11 of an electrostatic machine having electrodes 12 and 13 whereby the pickles are subjected to the electrical arcing discharge of 20,000 volts while being agitated on the conveyor 11 by reason of the eccentrically mounted rollers 14 as shown at 15. The sparks which are readily observed as passing between the electrodes 12 and 13 appear to produce minute openings or pores in the pickles and, as stated above, this electrostatic treatment may take place after the conventional pricking or the conventional pricking may follow the electrostatic treatment.

The treated pickles leave the electrostatic machine and travel down the conveyor 16 to be subsequently treated.

In connection with the inclined conveyors 10 and 16, as stated, these can also be constituted as a rinsing apparatus, the important consideration being that, for the purpose of the electrostatic machine, there be an adequate amount of salt present to facilitate the passing of the electrical current through the pickles, e.g., a removal of about 25% is adequate.

The conveyor 16 may be utilized in connection, alone, with the electrostatic machine and the cucumbers allowed to roll down the same or the conveyor 16 is agitated by means of an eccentric mounting such as shown at 15 as desired, in the electrostatic field.

If it is not desired to rinse the pickles before the electrical treatment, this removal of salt and water may subsequently take place in a manner to be later described.

Referring to FIGURE 1, the kettle 20 has a steam jacket 21 at its lower end and at its upper end has an inlet for air under pressure shown at 22, the air pressure being about 15 pounds in the kettle 20. The dill or syrup inlet is indicated at 23, a top outlet from the kettle is indicated at 24 which may lead by a conduit to a hot well 25 to create a vacuum within the kettle 20 or this vacuum may be created by the steam injector device 25' in line 24 or both means may be used. The pickles are introduced through the door 26 and steam is introduced to the jacket 21 at 27 and condensate is removed from the jacket at 28. The temperature in the kettle is maintained at about 125° F. The syrup, namely sugar or dill syrup, is introduced while a reduced pressure of about 17 inches of mercury is maintained on the pickles in the kettle, and covers the pickles. The syrup readily enters the pores in the pickles to assist in uniformly "equalizing" the pickles.

Thereafter, in the operation of this apparatus, air is introduced under pressure intermittently at 22 and the vacuum is created intermittently through the line 24 so as to continuously produce a breathing effect upon the pickles.

Since the pores of the pickles have been opened by the previous electrostatic treatment with or without the pricking treatment, the dill syrup or sugar syrup, by reason of the intermittent pressure and reduced pressure conditions in the kettle, will continue to penetrate the open pores in a highly satisfactory manner so as to "equalize" the pickles. The pressure is usually about 27 inches of vacuum but may vary between 27 and 29 inches and the air pressure may vary between 12 and 25 pounds, in the present instance, 15 pounds, p.s.i.g.

In the use of the kettle 20, pickles which have not been rinsed may be introduced to the kettle and subjected to the vacuum and pressure therein to remove the brine. Preferably, however, if the kettle is used in this manner, the rinsing will take place in the kettle with the water at about 100 to 125° F. and the NaCl removed in the amount desired.

Instead of using the apparatus shown in FIGURE 1, a rotating vat 30 shown in FIGURE 2 may be employed, the pickles being introduced and removed through the inlet 31, the air pressure through the line 32, and the syrup through the line 33 while the vacuum is created through the line 34. It will be observed that the inlets 32, 33 and the outlet 34 pass through the trunnions 35 and that the tank or vat 30 is rotated or oscillated by a chain drive 36 and motor 37, the chain being connected to a gear on the shaft 38 carrying the tank 30.

The treatment in the rotating vat 30 is similar to that described in connection with the kettle 20, the pickles being preferably discharged through the inlet 31 but may be removed through an outlet 39.

Both the vat 30 and the kettle 20 are constructed to tolerate an air pressure of 12 to 25 pounds, p.s.i.g., and a vacuum of 27 to 29 inches. The same breathing or intermittent action of the pressure and vacuum is continuously applied upon the pickles which have been partially de-salted and which have their pores opened either by the electrostatic treatment or by mechanical pricking or both.

By reason of the present invention, it is possible to do in one-half to one hour what was formerly necessary to take a month in the case of a sweet syrup. In this connection, the introduction of the dill is also expedited substantially.

Treatment in the kettle 20 or the vat 30 takes about 20 to 30 minutes, depending on the size of the kettle and the amount of the batch, the important consideration being to introduce the sugar or dill syrup and cover the pickles while a reduced pressure is present in the kettle or vat and to have the intermittent breathing action effect continuation of the introduction of the dill or syrup into the pores or holes formed by the pricking or electrostatic treatment or both to "equalize" the pickles.

In connection with the rotating vat 30 a steam jacket similar to the jacket 21 not shown is utilized, the steam being introduced through the trunnion at 40 and condensate removed from the jacket in the vat 30 at 41.

As previously indicated, de-salting may take place in the kettle 20 or the vat 30 by adding the rinse water and heating by means of the steam jacket while maintaining a reduced pressure, as described above, followed by the intermittent pressure and vacuum conditions recited so as to eliminate any desired percentage of the salt. Then any remaining water is drawn off and the dill or sweet syrup under reduced pressure as described is introduced followed by the breathing action.

After treatment in the kettle or rotating vat 30, the pickles are packed in jars with liquor from the kettle or vat in the usual manner.

While I have referred above to the usual dill and sugar syrups employed for preparing pickles, I also use, following the teachings of this invention, a sugar syrup which contains a mixture of sucrose and corn syrup, the corn syrup being present in amount of 40% to 60% of the total sugar and preferably about 50% by weight.

I claim:
1. In the process of making pickles having incorporated therein a syrup, wherein the pickles are initially held in an aqueous salt solution, the improvement which comprises subjecting pickles having about 25 to 50% of the original salt content removed but retaining a sufficient salt content effective to make them electrically conductive throughout their interior to an electrostatic field whereby to open up a multitude of pores in the pickles, and thereafter incorporating the syrup whereby it enters said pores and penetrates throughout the pickles.

2. The process according to claim 1 wherein the pickles are agitated while the electric current passes through them.

3. The process according to claim 1 wherein the syrup is incorporated while the pickles are under continuously applied intermittent positive and reduced pressure.

4. The process according to claim 3 wherein the salt content is first reduced by subjecting the pickles to reduced pressure.

5. The process according to claim 1 wherein the syrup is sugar syrup.

6. The process according to claim 1 wherein the syrup is dill.

References Cited in the file of this patent

UNITED STATES PATENTS

| | | |
|---|---|---|
| 1,261,412 | Lewites | Apr. 2, 1918 |
| 1,829,932 | Hey | Nov. 3, 1931 |
| 1,890,475 | Todd | Dec. 13, 1932 |
| 2,219,772 | Gernhardt | Oct. 29, 1940 |